United States Patent
Thaden et al.

(10) Patent No.: US 7,401,310 B1
(45) Date of Patent: Jul. 15, 2008

(54) INTEGRATED CIRCUIT DESIGN WITH CELL-BASED MACROS

(75) Inventors: Robert C. Thaden, Austin, TX (US); Steven C. Hesley, Austin, TX (US); Christopher B. Ang, Austin, TX (US); Jeffery E. Short, Austin, TX (US); Eric W. Mahurin, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 95 days.

(21) Appl. No.: 11/397,550

(22) Filed: Apr. 4, 2006

(51) Int. Cl.
*G06F 17/50* (2006.01)

(52) U.S. Cl. ............................................. 716/6; 716/7

(58) Field of Classification Search ................ 716/6, 716/7
See application file for complete search history.

(56) References Cited

U.S. PATENT DOCUMENTS

| | | | |
|---|---|---|---|
| 4,701,860 A * | 10/1987 | Mader | 716/12 |
| 5,031,111 A | 7/1991 | Chao et al. | |
| 5,396,435 A | 3/1995 | Ginetti | |
| 5,402,358 A | 3/1995 | Smith et al. | |
| 5,572,437 A | 11/1996 | Rostoker | |
| 5,898,595 A | 4/1999 | Bair et al. | |
| 5,987,086 A | 11/1999 | Raman et al. | |
| 6,567,967 B2 | 5/2003 | Greidinger et al. | |
| 2002/0069396 A1 | 6/2002 | Bhattacharya et al. | |
| 2003/0149953 A1 * | 8/2003 | Whitaker et al. | 716/17 |
| 2005/0076316 A1 * | 4/2005 | Pierrat et al. | 716/4 |
| 2006/0006454 A1 | 1/2006 | Wang | |
| 2006/0031800 A1 | 2/2006 | Nishikawa et al. | |
| 2006/0038171 A1 | 2/2006 | Hasumi et al. | |
| 2006/0048081 A1 | 3/2006 | Kiel et al. | |
| 2006/0053405 A1 | 3/2006 | De Oliveira Kastrup Pereira | |
| 2006/0059477 A1 | 3/2006 | Harscoet | |
| 2006/0064656 A1 | 3/2006 | Lakshmanan et al. | |
| 2006/0064662 A1 | 3/2006 | Tetelbaum et al. | |
| 2006/0064663 A1 | 3/2006 | Morita et al. | |
| 2006/0195810 A1 * | 8/2006 | Morton | 716/14 |
| 2007/0094623 A1 * | 4/2007 | Chen et al. | 716/4 |

OTHER PUBLICATIONS

Kick, B. et al. (1997). Standard-cell-based design methodology for high-performance support chips. IBM journal of Research and Development, 41(4/5), 505-514.*

(Continued)

*Primary Examiner*—Jack Chiang
*Assistant Examiner*—Aric Lin
(74) *Attorney, Agent, or Firm*—Robert C. Kowert; Meyertons, Hood, Kivlin, Kowert & Goetzel, P.C.

(57) ABSTRACT

A method for designing integrated circuits may include custom designing, at the transistor level, individual cells to be incorporated into cell-based macros. A macro-level function of an integrated circuit's design specification requiring custom, transistor-level design may be identified and custom cells may be designed at the transistor-level to meet the design specification. Custom designed cells may be included in cell-based macros, thus allowing cell-based simulation and verification methodologies and tools to be used on the integrated circuit design. Static timing analysis, circuit extraction and other characteristics may be defined for each custom cell and the timing analysis and circuit extraction for cell-based macros may be defined based on the timing and extraction information for the custom cells included in the macro.

18 Claims, 7 Drawing Sheets

OTHER PUBLICATIONS

Singh, K. J., & Subrahmanyam, P. A. (1995). Extracting RTL Models from Transistor Netlists. Proceedings of the 1995 IEEE/ACM International Conference on Computer-Aided Design, 11-17.*

IEEE Standard 1076.1-1999 (front page only, including abstract).*

* cited by examiner

INTEGRATED CIRCUIT DESIGN WITH CELL-BASED MACROS

BACKGROUND OF THE INVENTION

1. Field of the Invention

This invention is related to the field of integrated circuits, and more particularly, to designing and developing high-performance microprocessors.

2. Description of the Related Art

Typically, components of high-performance integrated circuits, such as microprocessors, are designed at the custom transistor level (e.g. using individual transistors, resistors and capacitors). Often state-of-the-art microprocessors are designed with feature sizes and operational speeds that have never before been achieved. Additionally, many of the required functions may be new/unique to this particular design. Traditionally, a circuit designer builds up the required function from discrete transistors tailoring each one to its exact requirements in order to produce a design that consumes minimal real estate and power, while delivering the needed performance. While excellent performance and area results may be obtained, such custom transistor-level design is very time consuming.

In order to validate his design, the designer may use one or more transistor level modeling tools, such as SPICE or HSPICE. These tools may provide extremely accurate simulation results, but may require relatively large amounts of computer resources and time to perform their functions. For example, a relatively simple design including a dozen or so transistors and associated components may require hours of simulation time for thorough analysis. Given that this simulation time may be exponentially proportional to the number of circuit elements, the validation time required for a custom transistor level design of even moderate complexity may quickly become daunting.

Generally, when the transistor level design/modeling of a function is complete, the designer generates transistor level model for verification. Typically, this verification may be done with respect to a Register Transfer Level (RTL) model that has itself been verified against the design specification. The verification of transistor level models is frequently an almost entirely manual operation, which may be extremely time consuming due to the unavailability of automated verification tools capable of operating on transistor level (TRL) models.

SUMMARY

A method for designing integrated circuits may include custom designing, at the transistor level, individual cells that may then be incorporated into cell-based macros. One embodiment of the present invention may include a method for designing an integrated circuit including identifying a macro-level function of the integrated circuit's design specification requiring custom, transistor-level design to meet a design specification for the integrated circuit. In some embodiments, the design specification may not be able to be met using cells from existing cell libraries. For example, cells from an existing library may utilize a standard transistor pitch layout that may not be usable for certain portions of the integrated circuit design to meet area constraints. Also, cells from an existing library may not meet performance requirements. After identifying such a macro-level function that requires custom transistor-level design, a circuit designer may perform a custom transistor-level design of a cell implementing a unit of functionality for the macro-level function and may also define a macro for the macro-level function using the custom-designed cell. The cell-based macro may include multiple custom designed cells and/or multiple cells of a single custom design, depending upon the exact requirements of the design specification. Additionally the circuit designer(s) may specify a design for the integrated circuit using the macro.

A circuit designer may define timing, extraction, and other characteristics for each custom-designed cell and timing, extraction and other characteristics for a cell-based macro may be defined or determined using the defined characteristics for the cells included in the cell-based macro. Thus, custom, transistor-level design circuitry may be included in custom cells that may be incorporated into cell-based macros. In some embodiments, cell-based and/or macro-based simulation and verification methodologies and tools that may not understand transistor level logic may be utilized for the integrated circuit design even through the design may include custom designed, transistor-level, logic implemented via cell-based macros, according to some embodiments.

BRIEF DESCRIPTION OF THE DRAWINGS

A better understanding of the present invention can be obtained when the following detailed description is considered in conjunction with the following drawings, in which.

Figure 1A:
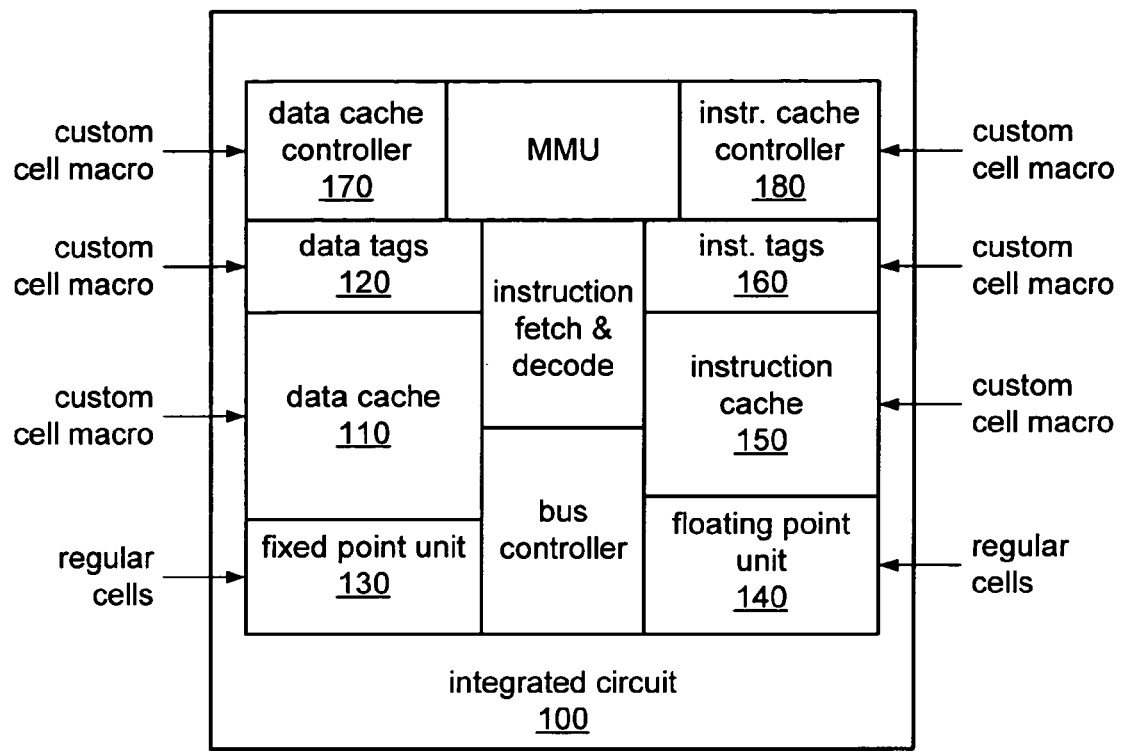
FIG. 1A is a block diagram of a design for an integrated circuit including macros designed including cells custom designed at the transistor-level, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

FIG. 1 is block diagram representing the design for an integrated circuit, according to one embodiment. Portions of the integrated circuit may be designed using an existing cell library. A cell represents a particular circuit function and includes the transistor level design for that function. Behavioral and timing models are also typically provided for each cell. By using a cell, a designer avoids having to perform the transistor level design and modeling for the particular function. However, a design for an integrated circuit, such as integrated circuit 100, may include portions that require transistor-level custom design to meet certain design requirements. For instance, the design specification for an integrated circuit, such as for integrated circuit 100, may include a design specification for a portion of the integrated circuit design that cannot be met using an existing cell library being used for other portions of the integrated circuit design. Thus, one or more portions of the integrated circuit design may be identified as requiring custom transistor-level design to met one or more design specifications/requirements. Such portions of the design are often portions that are specified as macro-level functions (macros). For example, integrated circuit 100 may represent a microprocessor in one embodiment and a design specification for integrated circuit 100 may include a register file requiring performance and size characteristics that may not be obtainable using existing cells from a cell library being used for other portions of the integrated circuit design. In other embodiments, integrated circuit 100 may represent various types of integrated circuits, such as processors, bus bridges, memory controllers, graphics controllers, etc.

The particular design portions that are identified to require custom transistor-level design may be one or more macro-level functions, in some embodiments. For example, in one embodiment, the requirements for integrated circuit 100 may include a design specification for a data cache that requires custom, transistor-level design, such as for data cache 110. A macro-level function, or other design specification requiring custom, transistor-level design, may require custom design (at the transistor level) for any of a number of reasons, such as timing, performance, speed, size, area, and/or other considerations. For example, a portion of a design specification for an integrated circuit may include particular performance, timing, area, size, pitch, or other requirements that cannot be met using existing cells, such from either an off-the-shelf, library of cells or using other in-house developed cells. In some embodiments, custom, transistor-level design may be required for portions of an design implementing memory arrays, RAM, ROM, register files, multipliers, datapaths and, in general, virtually any circuit including design macros for which existing cells are not generally suitable. The exact reason or reasons why a particular design specification or macro-level function of the design specification may not be met by existing library (or libraries) of cells may vary from embodiment to embodiments and according to the specific, individual, design specification.

For portions of the integrated circuit design identified as requiring custom transistor level design, a circuit designer may, in some embodiments, custom design (at the transistor-level) a cell implementing a unit of functionality for the identified macro-level function. The custom-designed cell may perform only a portion of the overall functionality for the macro-level function and multiple cells may be designed or combined to implement the full functionality of the macro-level function. The size of a cell may vary from including a single transistor level component to including many individual transistor-level components, according to different embodiments and depending on the exact nature of the particular circuit design requirements. In some embodiments, the functionality for a data cache, as according to the design specification, may be implemented as a macro including one or multiple custom designed cells and may also include other design elements, such as other cells, either commercially available or cells previously developed in-house. Additionally, custom-designed cells may be added to libraries for future use in later designs. Thus, when a circuit designer identifies a macro-level function of a design specification that cannot be met with existing cells, in some embodiments, that includes cells previously custom designed at the transistor level and stored in a library for future use. In some embodiments, custom-designed cells may by compatible with existing, off the shelf, library applications. In other embodiments, a custom library may be configured to store and manage custom-designed cells. Thus, in some embodiments, libraries of custom-designed cells may be generated and maintained for later use in cell-based macros, as described herein.

A macro implemented using custom-designed cells may be referred herein as a cell-based macro. For example, in FIG. 1, data cache 110, instruction cache 150, data tags 120, instruction tags 160, data cache controller 170 and instruction cache controller 180 are example of macro-level functions that may be designed as cell-based macros using custom designed cells, while other portions of the integrated circuit 100, such as fixed point unit 130 and floating point unit 140 may be designed using cells from an existing cell library (either commercial or in-house). Other portions of integrated circuit 100, such as the MMU, instruction fetch and decode and bus controller units may be designed using existing cells, custom designed cells/macros, or both. Please note that FIG. 1 represents only an example design and does not intended to represent any particular, working design. The various portions of integrated circuit 100 illustrated in FIG. 1 are included as examples only. Other embodiments may include different types of integrated circuits and/or different numbers of design elements and functional units than illustrated in FIG. 1 and those elements and units may be arranged differently than shown in FIG. 1.

In addition, as will be described in more detail below, when using cell-based macros, portions of the design and verification process may be performed using standard cell-based techniques and tools. For example, rather than having to perform pattern based verification at the transistor-level using, as is typically the case with circuits that are custom designed at the transistor-level, formal functional verification, such as via automated design verification software, may be performed on a circuit including custom designed cells and macros. Additionally, timing analysis, extraction, and other functional behavior may be performed or defined for each custom designed cell for a cell-based macro and the timing analysis, extraction and other function behavior of macros including the custom designed cell may be determined based on the timing, extraction and other behavior defined for the individual, custom designed cells. For example, circuit extraction may be performed or defined for individual cells and the macro extraction may be the extraction of the interconnections between the individual cells according to the extraction of those individual cells. Thus, rather than having to perform extraction at the transistor level for an entire macro (or for the entire integrated circuit, in some cases) extraction may be performed at the cell level, such as by using standard cell-based extraction software, according to come embodiments. In some embodiments, timing analysis at the cell level may not be static, but instead may involve a transient circuit analysis using an automated simulator to perform a simulation on an extracted cell circuit. Thus, timing analysis for cells may be semi-automated to ensure consistent analysis techniques across individual cells and designs. Analysis at the macro level may be static using a macro-interconnect extraction and the results of timing analysis for the individual cells of the macro. Additionally, in other embodiments, cell and macro level timing analysis may be fully automated with the use of one or more analysis tools.

In other words, the extraction, timing and functional behavior for an individual cell may be predefined, allowing timing analysis, extraction and verification of the overall circuit design to be performed using cell-based methodologies in place of more traditional (and slow) transistor level analysis, extraction and verification for macros. Since the characteristics for each individual cell may be predefined and analyzed at the individual cell level, analysis at the transistor level may be unnecessary for the design as a whole. After verifying that each cell performs as designed, the entire design may then be verified as the cell level.

Thus, as described in more detail below, cell-based macros may be designed using a cell-based approach including cells that are custom-designed at the transistor level, thereby possibly saving time and effort during the design process. For example, when using cell-based macro circuit design, a full transistor level design and simulation/verification may not be required. Since, in general, full transistor level design and simulation/verification can take an extremely long time to perform for even modest sized (in term of the number of gates) circuit. However, since the one or more of the cells used to create the macro are custom designed at the transistor level, the benefits of transistor level design for the macro are still largely achieved.

In some embodiments, the use of cell-based macros also may allow testing and verification using formal verification methodologies rather than the more traditional pattern-based verification at the transistor level. Generally, conventional transistor level custom designs require verification using simulations in which various patterns of signals and voltages are applied to the terminal pins of the various transistors of the design to verify that the transistor level design functions properly and according to an original design specification. Simply put, formal verification is a means of applying rigorous mathematical methods to exhaustively verify a system's operation. Typically, transistor level simulation and verification can be quite time consuming and therefore costly. Using cell-based macros, however, verification may be performed at the cell level since certain characteristics, such as extraction, timing, and functional behavior may be predefined for each cell, according to some embodiments. Thus, in some embodiments, formal verification programs and methodologies, which generally cannot be applied at the transistor level, may be used to verify an integrated circuit design having cell-based macros including cells custom designed at the transistor level.

For example, in one embodiment, the RTL (or register transfer level) or high level behavioral model, such as may be developed using a hardware description language (HDL) for a design may be compared directly to a gate-level model to establish equivalence and thus to verify the functionality of the design. Using cell-based macros, a designer may generate a gate-level model that is compatible and directly importable to various, off the shelf, formal verification applications. Thus, after designing and generating a functional (or RTL) model for each custom designed cell, the gate-level models for all the cells may be analyzed using formal verification applications and procedures to compare with a high level behavioral model for one or more macros or, in some embodiments, the entire design. Thus, avoiding a traditional pattern-based simulation at the transistor level, according to some embodiments.

Similarly, cell-based macros may allow certain benefits of static timing analysis to be realized with custom, transistor-level, designed circuitry. Utilizing static timing at the cell level may prevent the need for hand timing analysis and tweaking at the transistor level, according to one embodiment. When using cell-based macros to design an integrated circuit, a designer may create a gate (or Verilog) view of each custom designed cell and may characterize each cell to create a static timing view. Creating a gate-level view for each cell and characterizing the timing of each cell used for a cell-based macro may save design and verification time during later design stages and may reduce the complexity and time required for additional design process iterations.

Additionally, cell-based macros may allow extraction to be performed on individual cells rather than at the transistor level, even when the design includes custom designed (at the transistor level) cells. As with formal verification, discussed above, extraction may be defined for each custom designed cell and used when performing extraction at a macro-level or for an entire integrated circuit.

In some embodiments, most or all physical components of the circuit may be included in cells. Thus, in some embodiments most transistors of the circuit may be part of a cell. A designer may generate a simple gate-level model of the behavior of a custom designed cell and compare that against a SPICE net list to verify the functional behavior of the cell. After all the custom-designed cells have been defined and their individual functionality verified, formal verification may then be applied to the entire design (containing one or more cell-based macros) using the individual cell models, according to some embodiments. While described herein mainly in reference to digital logic and circuitry, in some embodiments a custom-designed cell for a cell-based macro may also include analog or mixed signal circuitry.

Figure 1B:
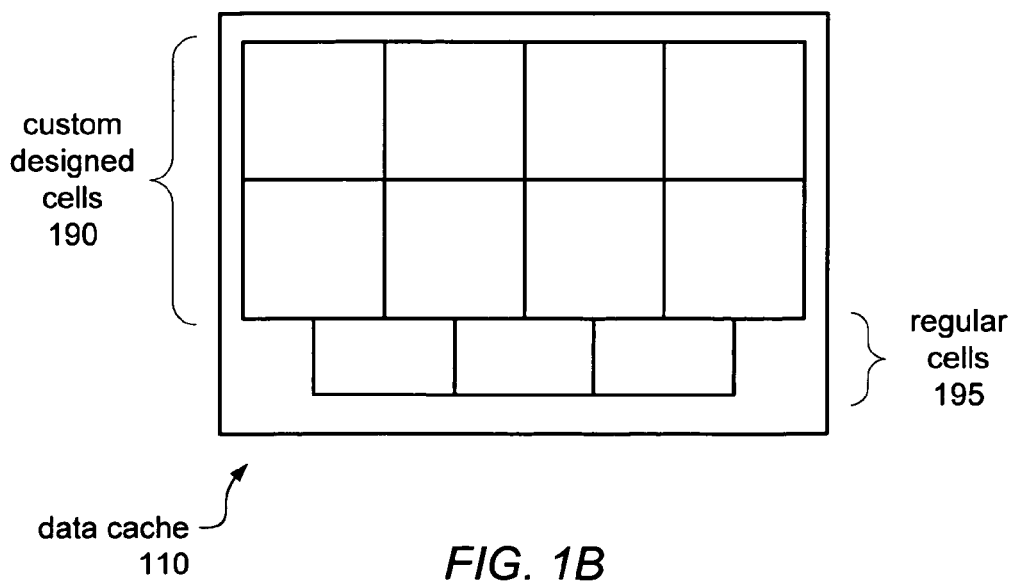
FIG. 1B is a block diagram illustrating one exemplary embodiment of a macro designed using multiple, custom-designed cells.

In some embodiments, a custom designed portion of an integrated circuit may be designed as a macro including multiple cells, either custom designed or regular, existing cell, or both. For example, as illustrated in FIG. 1B, the design for data cache macro 110 (from FIG. 1A) may be implemented using multiple cells, either existing, custom-designed or a mix of both. As illustrated in FIG. 1B, the exemplary data cache 110 may be designed using multiple custom-designed cells 190 and also using regular cell 195. For example, a circuit designer may custom design cells for the more performance (or timing, area or other design criteria) critical portions of the design specification for data cache 110 while using regular, existing cells, such as from an in-house library of previously designed cells, for the less critical (in term of requiring custom, transistor-level design) portions of data cache 110. In some embodiments, custom-designed cells 190 may include multiple, identical cells. In other embodiments, however, custom-designed cells 190 may include different cells, each of which may be custom-designed at the transistor level.

The characteristics of a macro may be defined based on the behavior and performance specification for the cells included in the macro, as described above. In some embodiments, formal verification methodologies and applications may be used to perform timing analysis, extraction, verification, and/or other analysis on a macro based on the individual timing analysis, extraction, verification and other characteristics of the individual cells in the macro. In some embodiments, macros may only be defined as groups of cells. In other embodiments, macros may also include individual transistor level circuitry that is not part of any cell. In some embodiments, some macros within a design may include only cells and different macros within the same design may include additional transistor-level circuitry that is not part of any particular cell.

Please note that FIG. 1B represents merely one exemplary configuration, according to one embodiment, for a macro implemented using cell-based macro circuit design. Other macros in other embodiments may include many more cells, either custom-designed, existing or both.

In some embodiments, a custom designed cell of an integrated circuit may not all utilize a single or standard pitch. For example, part of a circuit may require analog logic or may include size or functionality requirements that may prevent its design using a standard pitch. Cells may be custom designed using different pitches for different cells, or even using different pitches within a single cell. Since a circuit designer defines or specifies the timing, extraction and other characteristics and behaviors for a custom designed cell, various pitches may be used without requiring transistor level timing analysis for the entire integrated circuit. Additionally, in some embodiments, the physical boundaries and metal layers used in the design and layout of a cell may be arbitrary rather than constrained by the limitations of a particular cell library, as may be the case with standard cell libraries. A designer may be free to use virtually any physical arrangement of components and may also use metal layers in manner that is most appropriate for the particular performance requirements for an individual design when using cell-based macros. Cell-based macros may also, in some embodiments, allow a cell-based approach to the design and verification for custom designed portions of a circuit that cannot fit into a standard pitch used for other portions of the circuit. Thus, cell-based macro circuit design may provide a circuit designer flexibility in terms of pitch and other layout characteristics, according to some embodiments.

Thus, cell-based macros may provide the benefits of transistor-level custom design where every component or functional block of a circuit may be designed at the transistor-level but may also allow those functional blocks to be characterized, verified and extracted at a cell-level using standard formal verification applications and methodologies. In contrast to traditional, transistor-level in situ customization of integrated circuit designs, cells may be treated as black box entities by the design and verification tools and may be fully characterized for timing, noise, reliability, etc. For example, in some embodiments gate-level netlists may be generated both by directly synthesizing Register Transfer Level (RTL) code and by manually drawing schematics. Additionally, cell placement and interconnect routing may be generated using both automatic techniques and manual specification. Thus, the performance and electrical characteristics of each custom designed cell may be defined, analyzed and optimized individually. Verification of the entire design may involve verifying the interaction between the cells/macros, rather than analyzing and verifying the entire design at the transistor-level. In other words, once the performance of individual custom designed cells have been defined, optimized and verified, the cells and/or macros may be treated as black boxes during formal verification of the entire circuit design. Macros including multiple cells may be defined, analyzed and optimized at the cell-level rather than at the transistor-level, according to some embodiments.

When designing the individual cells of cell-based macros a layout designer may hand layout and route connections between the individual components within a cell, rather than using an automated routing tool. Since the layout for blocks within a cell may be performed by hand the layout for a cell may need to processed further in order for the layout to conform the rules and expectations of downstream, cell-based analysis tools. In some embodiments, the routing within a cell may not include connections directly to the pins in a cell. Instead, a layout designer may route connections to other metal that is electrically connected to a pin. The layout and routing may be electrically correct but may individual connections may not be designated as actually connected to a pin. In some embodiments, the routing connections may be considered to be at a lower level in the design hierarchy than the actual pins of a cell. Thus, cell-based analysis tools may not be able to correctly use or analyze such a cell layout. In order to take advantage of cell-based macro design using cell-based analysis tools, a designer may also perform layout shape tracing to determine which shapes within a cell are associated with cell pins and may promote those shapes to a higher level in the design hierarchy. In some embodiments, the designer may promote such shapes to the highest, or top, layer of the design hierarchy. After promoting the appropriate shapes, the layout and routing may correctly reflect connections to the actual pins of a cell. Thus, the layout may correctly reflect the correspondence between the schematic and the layout of for a design. In other words, after promotion, a layout may correctly denote connections to the pins of a cell and not just to metal that may be electrically connected to the pins.

Such promotion (with the design hierarchy) may also expose more of a cell's internal routing information to cell-based tools, allowing those cell-based tools to better analyze and use the internal routing and connections within a cell. For example, a cell-based extraction tool may treat all cell model shapes as ground during extraction but after promotion may be able to extract coupling capacitors for cell model shapes allowing the modeling of additional information and effects, such as noise and/or capacitance across connections with the cell using cell-based analysis. For instance, since without (or before) promotion all the shapes within a cell may be considered ground (for certain analyses), it may not be possible to correctly model and analyze the noise and/or capacitance effect across particular connections with the cell. However, after promotion the effect of noise changes may be correctly analyzed across particular connections since the cell-based analysis tool may recognize the connections to actual cell pins and therefore be able to isolate particular noise effects for individual connections between cell pins.

Cell-based macros may also increase the efficiency of design-for-test (DFT) and automated test pattern generation (ATPG) processes, according to some embodiments. For example, DFT/ATPG teams may, in some embodiments, be able to utilize cell-based tools that otherwise may not be compatible with a circuit (or portions of a circuit) that include transistor-level custom designed logic. For circuits designed using cell-based macro DFT/ATPG teams may avoid generates special, custom models for logic that is custom designed at the transistor level. Thus, circuit designed using cell-based macros for logic traditionally requiring custom, transistor level, designs may adhere for various DFT and ATPG design and testing methodologies, guidelines and/or policies, in some embodiments.

In some embodiments, a circuit designer may design portions of an integrated circuit at the transistor level and then divide the design into a set of cells for use in a cell-based macro. The functionality of the macro may be designed as a collection of cells, each aggregating one or more transistor level components. When using cell-based macros, a circuit designer may use cell-based or transistor-level simulation and verification (or both cell-based and transistor-based simulation and verification). Thus, a designer may use transistor-level testing (functional pattern testing) on each cell and may then generate a simpler, high-level design using cells and cell-based macros. After each cell is tested, cell-based and/or macro-based formal verification may be used to test and verify the entire circuit's characteristics, functionality and/or behavior.

Figure 2:
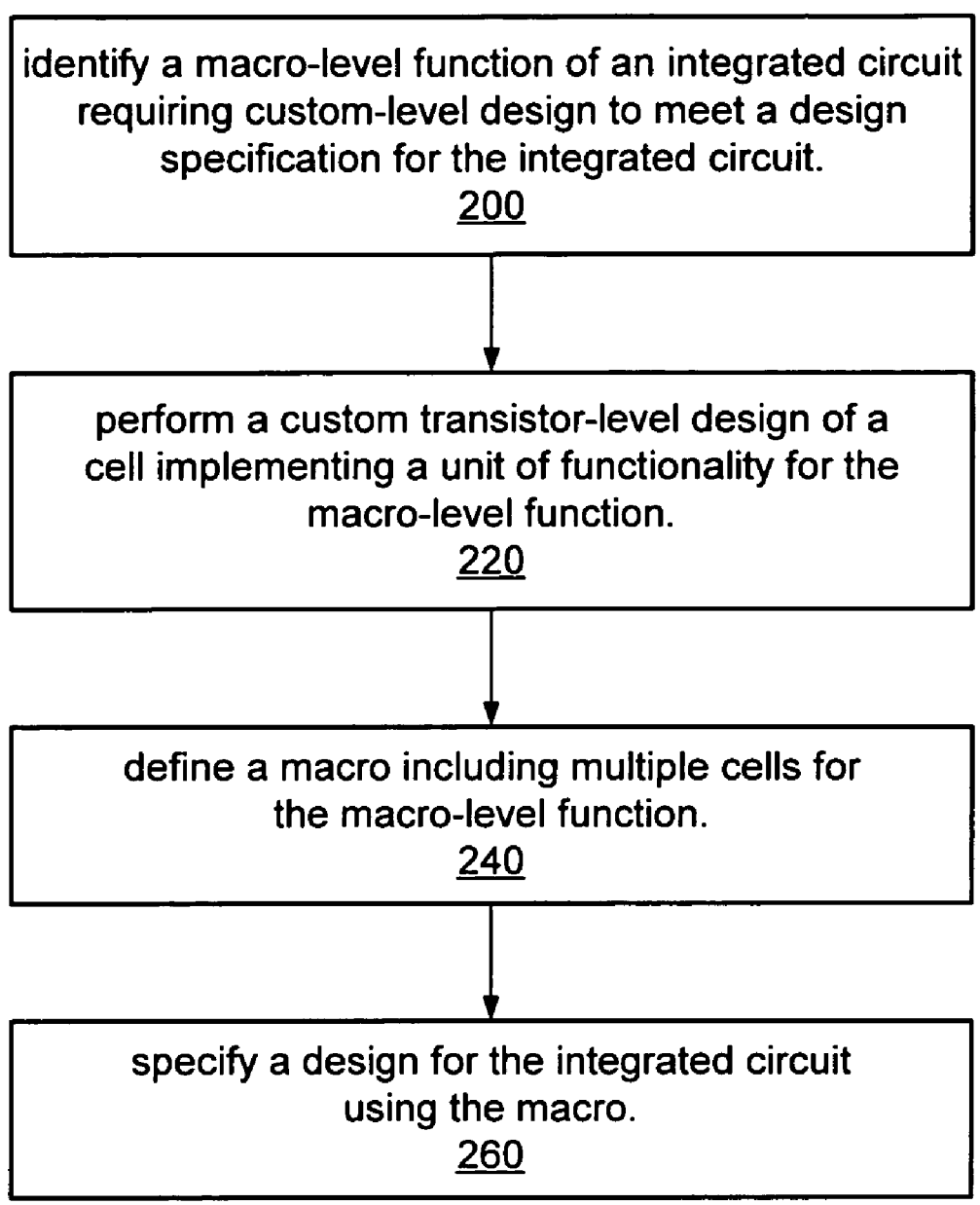
FIG. 2 is a flowchart illustrating one embodiment of a method for designing an integrated circuit using custom designed macros and cells.

FIG. 2 is a flowchart illustrating one method for designing an integrated circuit using custom-designed cells for cell-based macros. As illustrated by block 200, a circuit designer may identify a macro-level function of an integrated circuit requiring at least some custom-level design to meet a design specification for the integrated circuit. As described above, a design specification for an integrated circuit, such as for a microprocessor may include a design specification that may not be met by existing cells from either commercially available cell libraries or from cells previously custom-designed in house. None of the available cells, nor a combination of the available cells, from a standard cell library may be able to meet a particular design requirement or specification for the integrated circuit. For example, in some embodiments, the design specification for the integrated circuit may include a timing requirement that cannot be met using cells from an existing cell library that is being used for the designing of the integrated circuit. As another example, an area requirement for the macro-level function may not be obtainable using a standard pitch size of the cells available from the existing cell library. The design specification for an integrated circuit may include specifications for macro functions such as memory arrays, register files, tag-memory for a first-level cache, and/or other specifications that may not be met using the existing cells.

Thus, given the design specification that cannot be met using existing cells, instead of creating a custom transistor level design for the entire identified macro-level function, a circuit designer may custom design, at the transistor-level, a cell (or cells) to implement the macro. In some embodiments, at least one custom-designed cell may be designed to implement a unit of functionality for the macro-level function, as indicated by block 220. As noted above, a macro for implementing the relevant design specification may include one or more cells, and may include both custom-designed and existing cells.

Additionally, as indicted by block 240, a cell-based macro for implementing the macro-level function of the design specification may be defined including one or more of the custom designed cells, according to some embodiments. Additionally, in some embodiments, the macro may also include specific, custom transistor-level design and one or more standard cells as well as one or more custom designed cells, according to the particular design specification and required functionality of the macro-level function of the integrated circuit. In some embodiments, the cell-based macro may include multiple copies of a custom-designed cell.

As illustrated by block 260, a design may be specified for the integrated circuit using the defined macro. Thus, after identifying a macro-level function requiring custom-level design and designing, at the transistor level, a custom cell implementing at least a unit of functionality for the macro-level function, a cell-based macro including the custom-designed cell or cells (and possibly other cells or even custom transistor level circuit design) may be defined and used as part of a design for the integrated circuit. In some embodiments, multiple macro-level functions requiring custom, transistor-level design may be identified and thus, multiple custom-designed cells may be defined and used to design multiple cell-based macros.

Figure 3:
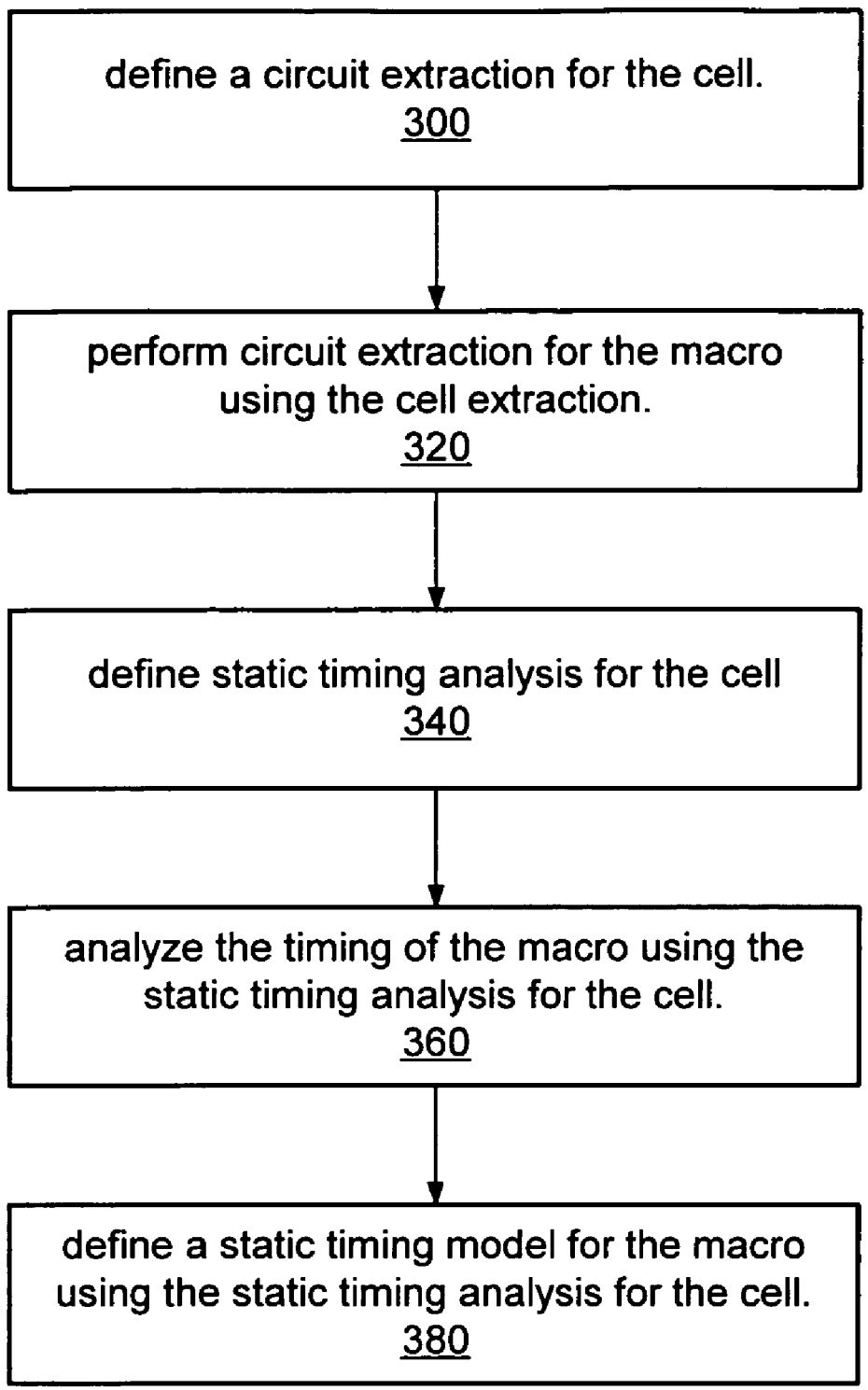
FIG. 3 is flowchart illustrating one embodiment of a method for designing an integrated circuit using custom designed macros and cells.

FIG. 3 is a flowchart illustrating one embodiment of a method for custom designing a cell-based macro using custom-designed cells, as described herein. As part of designing a cell-based macro using custom-designed cells, performance and other characteristics may be defined for each custom-designed cell and used to define the timing and electrical characteristics for the cell-based macro, according to certain embodiments. As indicated by block 300, a circuit designer may define a circuit extraction for a custom-designed cell. Generally, extraction is performed after the circuit designer has completed the layout (geometric arrangement and description of the physical components of the circuit) for the particular circuit design. The process of extraction is used to determine (e.g. to "extract") the electrical characteristics, such as capacitance and resistance, of various components and interconnects within the integrated circuit design layout. While extraction may, in some embodiments be performed manually, in many embodiments automated extraction software may be used. In general any acceptable method and/or tools may be used to perform the extraction, according to different embodiments. In some embodiments, extraction software, either custom, in-house software, or commercially available, off-the-shelf software, may be able to use the defined extraction information for the custom cells to then automatically generate (at least a portion) of the circuit extraction for the macro using the extraction for the custom-designed cells. Thus, an integrated circuit designer may manually define the extraction characteristics (e.g. the resistance and capacitance) for a custom-design cell, in one embodiment. In another embodiment, the designer may apply an automated extraction application to the circuit design for the cell. In some embodiments, the designer may perform/define the extraction characteristics for a custom-design cell in isolation and not as part of the overall integrated circuit design.

After defining a circuit extraction for individual cells, the circuit designer may also perform circuit extraction for the macro using the extraction information for all the individual cell's included in the macro, as indicated by block 310. For example, a macro may be designed using multiple custom-designed cells, such as data cache 110 illustrated in FIG. 1B and described above. The circuit designer may define the circuit extraction for each of the individual custom-designed cell and circuit extraction for the data cache 110 macro may be performed using the extraction information for each of the individual cells. Thus, by custom designing a cell and by defining a circuit extraction for the cell, a circuit design may then perform circuit extraction for the macro using the cell extraction. Thus, even though the design specification for a macro may require custom transistor-level design, cell-based circuit extraction may be performed for the macro using the circuit extraction for each custom-designed cell used in the macro design, according to some embodiments.

Additionally, as indicated by block 340, a circuit designer may also define static timing analysis for a custom-designed cell and use the cell-based static timing analysis to analyze the timing of the macro, as illustrated by block 360. In some embodiments, defining static timing for custom designed cells may allow automated or automatic cell-level timing analysis for the macro using the static timing for the cell or cells of that macro. Thus, in some embodiments, rather than analyzing the timing of an entire transistor level circuit design for a macro, by custom-designing cells at the transistor level and defining the static timing analysis for each of those custom-designed cells, cell-level static timing analysis may be performed on the macro circuit design. For example, automated timing analysis software may be configured to use the static timing analysis for each cell included in the circuit design for the macro to perform timing analysis for the entire macro's circuit design, according to some embodiments.

Furthermore, by defining a static timing analysis for individually custom-designed cell, static timing models may be defined for macros including those cells. As indicated by block 380, a static timing model for a macro may be defined using the static timing analysis for individual cells included in the circuit design for the macro. For example, by defining the static timing analysis (and/or static timing models) of the individual custom-designed cells 190 illustrated in FIG. 1B, a static timing model may be defined for the data cache 110 macro using the static timing for the individual cells included in the circuit design for the macro. Thus, a cell-based approach may be used to defining a static timing model for the custom designed macro even though the underlying circuit for the macro was custom designed at the transistor level.

Figure 4:
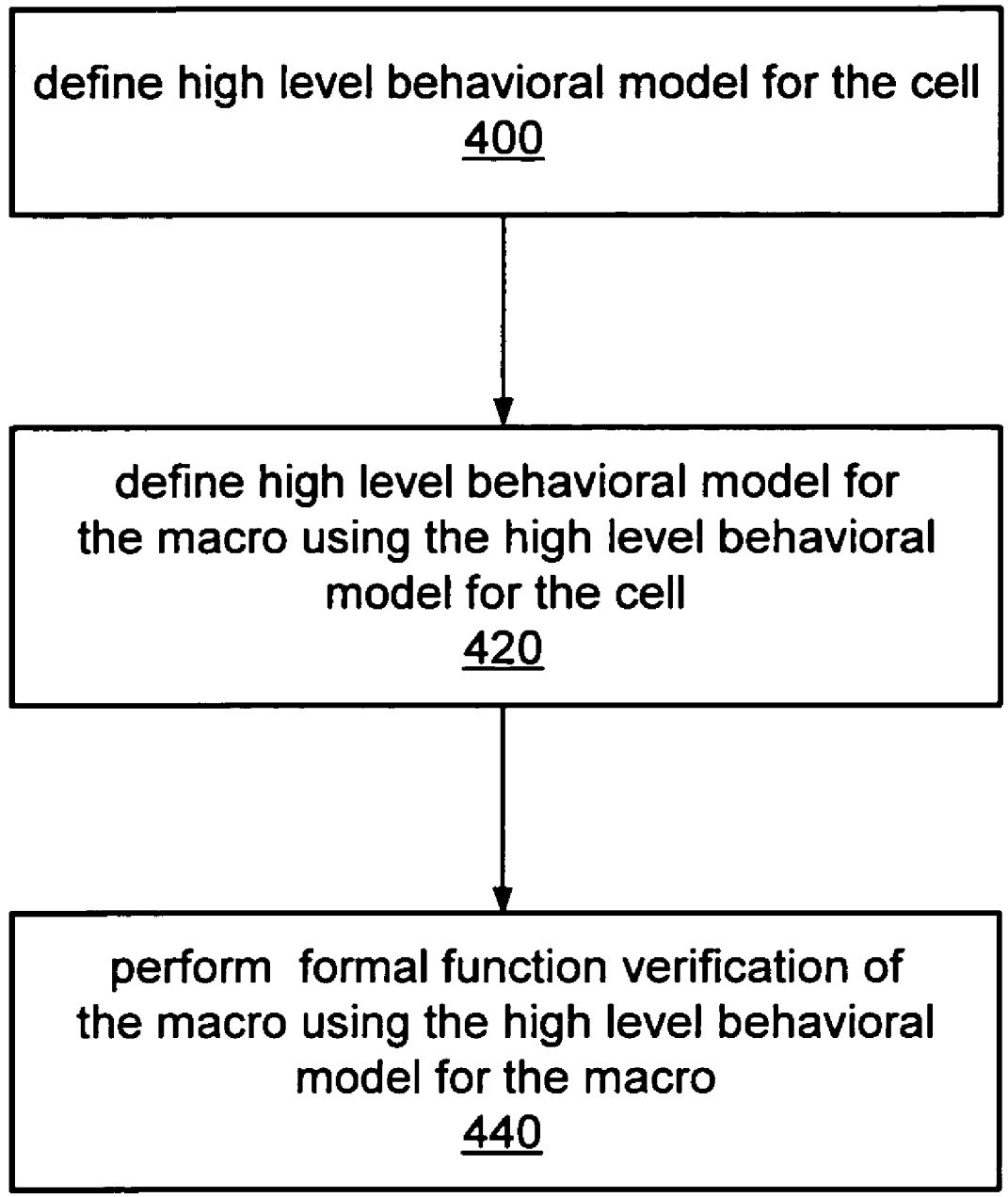
FIG. 4 is a flowchart illustrating one embodiment of a method for defining RTL models as part of designing an integrated circuit using custom designed macros and cells.

FIG. 4 is a flowchart illustrating one embodiment of a method for defining RTL, or high level behavioral, models for macros designed using RTL or high level behavioral models for custom-designed cells. As indicated by block 400, a circuit designer may, in some embodiments, define an RTL model (sometimes referred as a functional or behavioral) for the circuit design of a custom-designed cell. In other embodiments, a high level behavioral (or RTL) model may be extracted using an automated tool. A behavioral or RTL model may be simulated to verify that the design of a cell performs as expected in some embodiments. High level behavioral (such as RTL) modeling, simulation and verification may be performed either manually or may be at least partially automated, according to different embodiments. As verifying an RTL or other high level behavioral model for a circuit design is well understood in the art, it will not be discussed in detail herein. As illustrated by FIG. 420, a high level behavioral model, such as an RTL model may be defined for a macro using the behavioral model(s) for the individual custom-designed cells included in the circuit design for the macro. In some embodiments, a macro may be designed using both custom-designed and existing cell and the high level behavioral models for both the custom-designed and existing cells may need to be used when defining a high level behavioral model for the macro.

Additionally, formal function verification may be performed for the macro design using the high level behavioral or RTL model of the macro, as defined using the RTL models of the individual cells included in the circuit design of the macro, according to some embodiments and illustrated by block 440. For instance, in some embodiments, the high level behavioral models of the individual cells of a macro's circuit design may be used to generate a Verilog (or other gate-level) model of the macro's circuit design. The gate-level model may then be compared to the behavioral model for the same circuit design to verify that the two function equivalently. Thus, by defining a high level behavioral or RTL model for each custom-designed cell and using the individual cell-level RTL models to generate a high level behavioral or RTL model for a macro, formal verification for a macro's circuit design may be performed at the cell or macro level rather than using pattern-based functional verification at the transistor level.

As illustrated by FIGS. 2, 3 and 4, described above, cell-based circuit design, simulation and verification methodologies may be used for integrated circuit designs requiring custom, transistor-level design.

Figure 5:
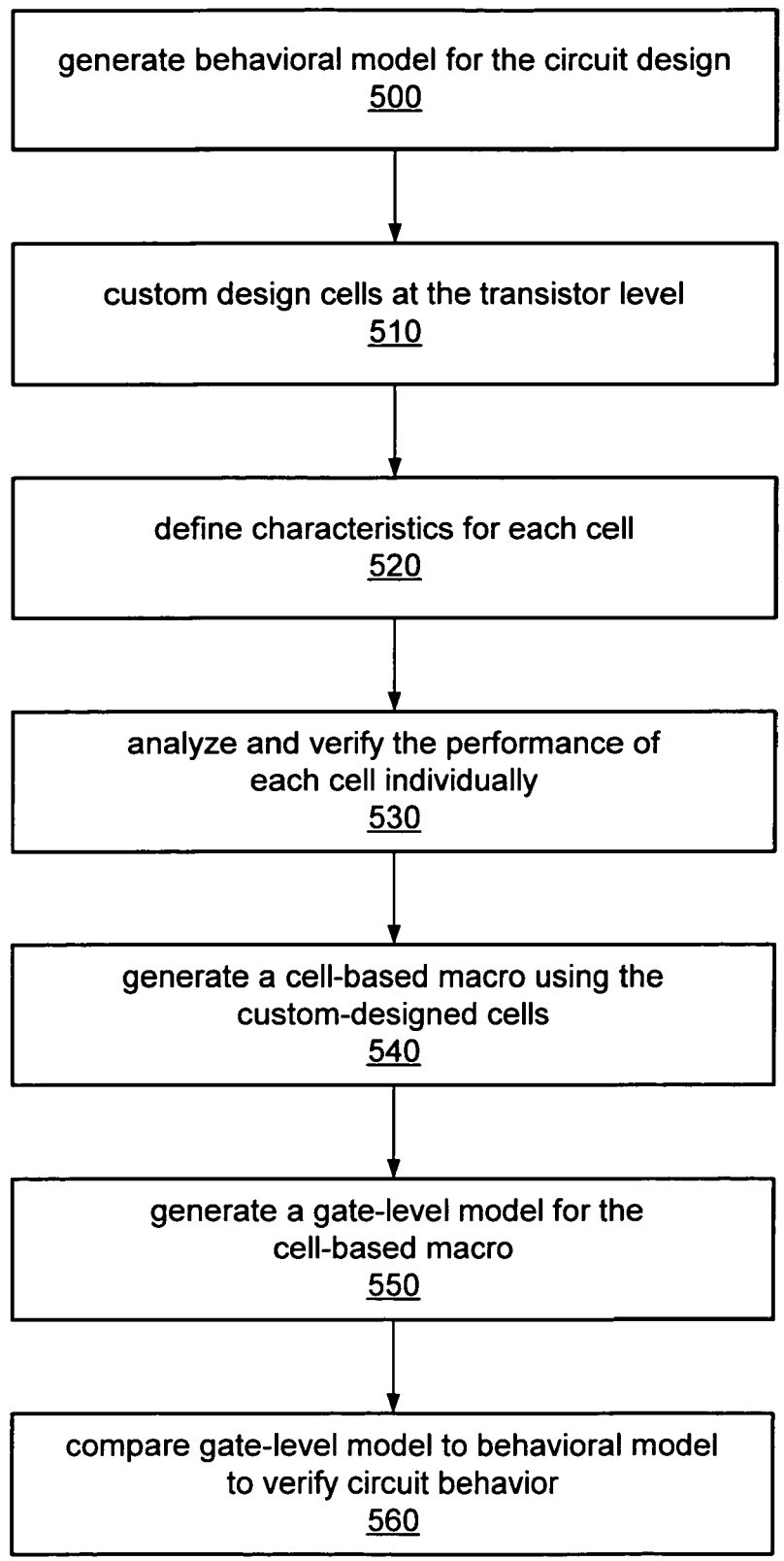
FIG. 5 is a flowchart illustrating one embodiment of a method for designing an integrated circuit using custom designed macros and cells.

FIG. 5 is a flowchart illustrating one embodiment of a method for cell-based macro circuit design, as described herein. As described above, in some embodiments, designing an integrated circuit using cell-based macro circuit design may begin by generating a behavioral and/or functional model, sometimes referred to as a RTL or HDL model, for the integrated circuit or a portion of the integrated circuit, as illustrated by block 500. In some embodiments, a circuit designer may manually generate a behavioral model. In many embodiments, however, one or more automated tools may be used to assist in generating a behavioral model. The behavioral model may be developed using any of various hardware description languages (HDLs). The functional model may specify the intended or desired behavior of the circuit (or a portion of the circuit, such as a identified macro-level function) and may specify one or more behaviors that traditionally require custom, transistor level design. For instance, many microprocessors require memory arrays and or register files that may be provided without such custom, low-level design.

After generating a behavioral model for the integrated circuit, individual cells may be custom designed at the transistor level, as indicated by block 510, to implement various parts or units of functionality of the design specification. For instance, the behavioral/functional model may be analyzed, either manually, by using one or more automated analysis tools, or using a combination of both manual and automated analysis, to identify one or more portions of the model that may be implemented using custom-designed cells. Various design characteristics and requirements, such as performance, power, noise, or other characteristics, may be used as a basis for determine the exact number of custom-designed cells and the functional boundaries of the cells. In some embodiments, one or more portions of the functional model may be identified that cannot be implemented using any existing or pre-defined cells. For example, portions of the functional model may specify high performance behavior, or may require non-standard pitch, timing, or dynamic logic and thus may not be implemented using existing cells.

As indicated by block 520, the various characteristics, such as circuit extraction and static timing analysis and other functional behavior, may be defined for each cell. As noted above, a circuit designer may define (or pre-define) the characteristics for each custom-designed cell. By predefining the characteristics for each cell, the need for transistor-level simulation and verification of the entire integrated circuit may be avoided, according to some embodiments. Instead, cell-based formal verification may be used on integrated circuit designs including cell-based macros. For instance, after the cells have been designed that meet the design specification and that function according to the defined characteristics, the entire integrated circuit may be verified at a cell level, using the characteristics for each cell. For instance, as described above, the timing, extraction and verification characteristics for each cell-based macro may be determined (either defined or derived) based on the timing, extraction and verification characteristics for each of the individual, custom-designed cells included in the particular cell-based macro.

Additionally, the performance of each custom-designed cell may be analyzed and verified individually, as indicated by block 530. For instance, in some embodiments, the design for a cell may be modeled, much like a traditional RTL model, and compared against the relevant portion of the behavioral or functional model to ensure that the cell is designed to behave correctly and that once all the cells have been put together into a single integrated circuit, the integrated circuit, as a whole, performs correctly. In some embodiments, the timing and electrical characteristics for each cell may be defined before the actual logic of the cell is designed, based on the behavior specified in the relevant section of the functional model. In other embodiments, however, the cell's electrical characteristics defined according to internal design of the cell.

As described above and illustrated by block 540, a cell-based macro may be generated (designed) using one or more custom-designed cells. As described above, generating cell-based macros that include custom-designed cells may, in some embodiments, allow cell-based design, equivalence, and/or verification methodologies to be applied to a custom design that otherwise might require transistor-level, pattern-based, simulation and verification.

After all of the cells have been designed and verified, a cell-based gate-level model, sometimes called a Verilog netlist or model, may be generated for the cell-based macro, using the individual custom-designed cells, as indicated by block 550. A gate-level model may be generated using any of various third party tools, such as Verilog tools. In general, any of various tools may be used to generate a gate-level model (sometimes called a netlist), according to different embodiments. The gate-level model may be based on a cell-level such that the interaction between the cells is modeled, rather than the internal logic of each cell being modeled, according to some embodiments. When generating a gate-level model, the logic of each cell, a gate level model may be created for each view. Additionally, a static timing model for each cell may also be generated, sometime called characterization. As with other aspects of cell-based macro circuit design, timing models may be generated by hand or by using an automated, or semi-automated software application. By created a gate level model of each cell, additional iterations of the design processes, such as may be required to include changes to the functionality or to correct design errors, may be performed without having to regenerate a gate-level model of the entire The gate-level model may be compared to the functional model to verify that the integrated circuit design or of the macro, as a whole, functions equivalently to the original behavioral/functional model, as illustrated by block 560. In some embodiments, an automated formal verification tool may be used to perform the equivalence comparison between the gate-level model with the original functional model.

Thus, in some embodiments, by first verifying that each custom-designed cell functions correctly, as described above, and then using a cell-based gate-level model to verify the behavior of cell-based macros including the custom-designed cells, a full transistor level simulation/verification, such as pattern-based testing/verification, may be avoided. By using cell-based macros, even those portions of an integrated circuit that require custom, or hand, design at the transistor level may take advantage of cell-based implementation and formal verification methodologies. Additionally, when using cell-based macros, standard or off-the-shelf verification and equivalence checking tools may be used even though portions of the integrated circuit may have been custom designed at the transistor level and even though verification and equivalence checking tools may not understand transistor level logic.

Figure 6:
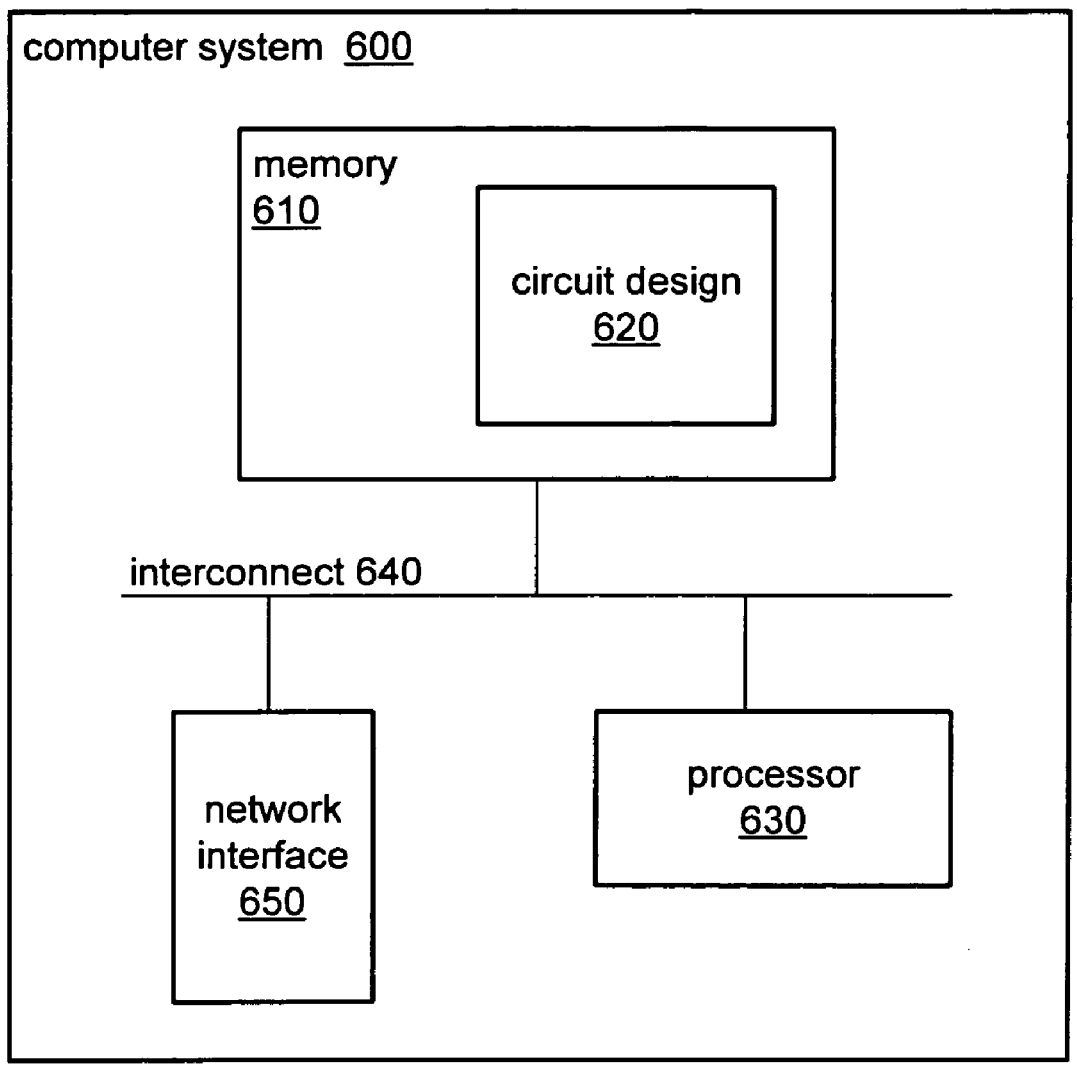
FIG. 6 is a flowchart illustrating one embodiment of a method for designing an integrated circuit using custom designed macros and cells.

FIG. 6 illustrates a computing system capable of implementing cell-based macro circuit design, as described herein and according to various embodiments. Computer system 600 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device configured to help circuit designers design integrate circuits.

Computer system 600 may include at least one processor 630. Processor 630 may couple across interconnect 640 to memory 610. Memory 610 is representative of various types of possible memory storage media, also referred to as "computer-accessible storage media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 610 may include a computer-usable data structure defining a design for an integrated circuit, such as integrated circuit 100, described above. The data structure may be generated using any of various automated circuit design, analysis, and verification tools, according to some embodiments. Such a data structure may also include definitions and other data or information regarding custom-designed cells, existing cells and/or cell-based macros as described above as part of the design for an integrated circuit.

Figure 7:
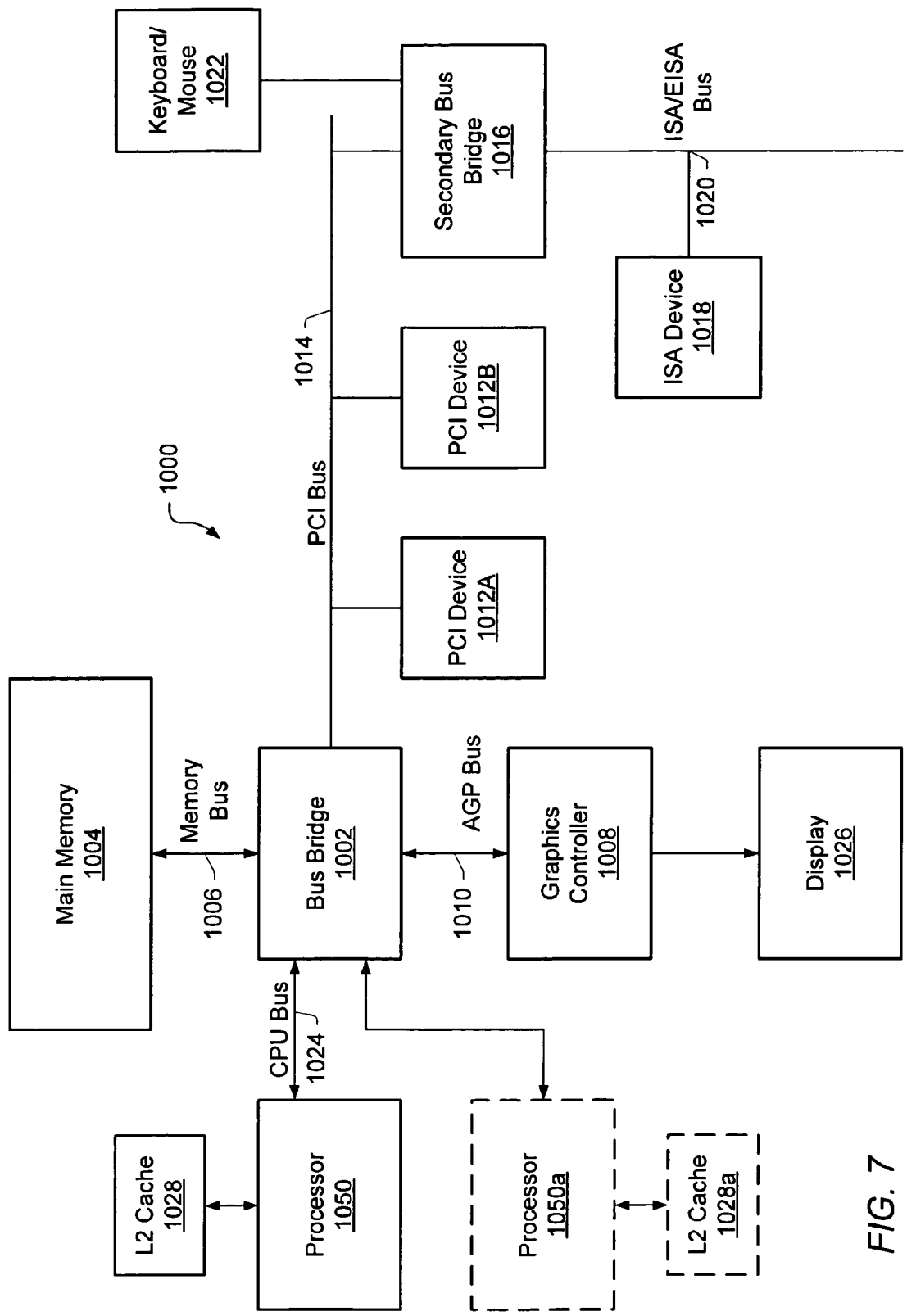
FIG. 7 shows a block diagram of one embodiment of an exemplary computer system.

FIG. 7 shows a block diagram of one embodiment of a computer system 1000 that includes a microprocessor 1050 coupled to a variety of system components through a bus bridge 1002. In some embodiments, microprocessor 1050 may include an integrated circuit, such as integrated circuit 100, designed using custom cells designed at the transistor level and incorporated into cell-based macros, as described above. In the depicted system, a main memory 1004 is coupled to bus bridge 1002 through a memory bus 1006, and a graphics controller 1008 is coupled to bus bridge 1002 through an AGP bus 1010. Several PCI devices 1011A-1011B are coupled to bus bridge 1002 through a PCI bus 1014. A secondary bus bridge 1016 may also be provided to accommodate an electrical interface to one or more EISA or ISA devices 1018 through an EISA/ISA bus 1020. In this example, microprocessor 1050 is coupled to bus bridge 1002 through a CPU bus 1024 and to an optional L2 cache 1028. In some embodiments, the microprocessor 100 may include an integrated L1 cache (not shown).

Bus bridge 1002 provides an interface between microprocessor 1050, main memory 1004, graphics controller 1008, and devices attached to PCI bus 1014. When an operation is received from one of the devices connected to bus bridge 1002, bus bridge 1002 identifies the target of the operation (e.g., a particular device or, in the case of PCI bus 1014, that the target is on PCI bus 1014). Bus bridge 1002 routes the operation to the targeted device. Bus bridge 1002 generally translates an operation from the protocol used by the source device or bus to the protocol used by the target device or bus.

In addition to providing an interface to an ISA/EISA bus for PCI bus 1014, secondary bus bridge 1016 may incorporate additional functionality. An input/output controller (not shown), either external from or integrated with secondary bus bridge 1016, may also be included within computer system 1000 to provide operational support for a keyboard and mouse 1022 and for various serial and parallel ports. An external cache unit (not shown) may also be coupled to CPU bus 1024 between microprocessor 1050 and bus bridge 1002 in other embodiments. Alternatively, the external cache may be coupled to bus bridge 1002 and cache control logic for the external cache may be integrated into bus bridge 1002. L2 cache 1028 is shown in a backside configuration to microprocessor 1050. It is noted that L2 cache 1028 may be separate from microprocessor 1050, integrated into a cartridge (e.g., slot 1 or slot A) with the microprocessor, or even integrated onto a semiconductor substrate with the microprocessor.

Main memory 1004 is a memory in which application programs are stored and from which microprocessor 1050 primarily executes. A suitable main memory 1004 may include DRAM (Dynamic Random Access Memory). For example, a plurality of banks of SDRAM (Synchronous DRAM) or Rambus DRAM (RDRAM) may be suitable. Additionally, main memory 1104 may include a computer-usable data structure defining a design for an integrated circuit, such as integrated circuit 100, that may include both custom-designed and existing cells, such as from a standard cell library, and cell-based macros, as describe herein.

PCI devices 1011A-1011B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 1018 is illustrative of various types of peripheral devices, such as a modem, a sound card, and a variety of data acquisition cards such as GPIB or field bus interface cards.

Graphics controller 1008 is provided to control the rendering of text and images on a display 1026. Graphics controller 1008 may embody a typical graphics accelerator generally known in the art to render three-dimensional data structures that can be effectively shifted into and from main memory 1004. Graphics controller 1008 may therefore be a master of AGP bus 1010 in that it can request and receive access to a target interface within bus bridge 1002 to thereby obtain access to main memory 1004. A dedicated graphics bus accommodates rapid retrieval of data from main memory 1004. For certain operations, graphics controller 1008 may further be configured to generate PCI protocol transactions on AGP bus 1010. The AGP interface of bus bridge 1002 may thus include functionality to support both AGP protocol transactions as well as PCI protocol target and initiator transactions. Display 1026 is any electronic display upon which an image or text can be presented. A suitable display 1026 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 1000 may be a multiprocessing computer system including additional microprocessors (e.g., microprocessor 1050a shown as an optional component of computer system 1000). Microprocessor 1050a may be similar to microprocessor 1050. More particularly, microprocessor 1050a may be an identical copy of microprocessor 1050 in one embodiment. Microprocessor 1050a may be connected to bus bridge 1002 via an independent bus or may share CPU bus 1024 with microprocessor 1050. Furthermore, microprocessor 1050 may be coupled to an optional L2 cache 1028a similar to L2 cache 1028.

As noted above, microprocessor 1050 may represent one embodiment of an integrated circuit designed using cell-based macros as described herein. Additionally, in other embodiments, other items illustrated in FIG. 7, such as bus bridge 1002, l2 cache 1028, graphics controller 1008, PCI device 1012 and ISA device 1018, may also include integrated circuits designed using cell-based macros as described herein.

While the invention has been described with reference to various embodiments, it will be understood that these embodiments are illustrative and that the scope of the invention is not limited to them. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

Although the embodiments above have been described in detail, numerous variations and modifications will become apparent once the above disclosure is fully appreciated. It is intended that the following claims be interpreted to embrace all such variations and modifications.

Numerous variations and modifications will become apparent to those skilled in the art once the above disclosure is fully appreciated. It is intended that the following claims be interpreted to embrace all such variations and modifications.

What is claimed is:

1. A method for designing an integrated circuit, comprising:
   identifying a macro-level function of the integrated circuit requiring custom transistor-level design to meet a design specification for the integrated circuit, wherein said identifying comprises determining that the design specification cannot be met for the macro-level function using cells from an existing cell library to be used for designing the integrated circuit;
   performing a custom transistor-level design of a cell implementing a unit of functionality for the macro-level function to meet the design specification for the integrated circuit;
   defining a macro for the macro-level function, wherein said macro comprises multiple ones of said cell;
   specifying a design for the integrated circuit using the macro to meet the design specification for the integrated circuit;
   performing a circuit extraction for the cell; and
   performing circuit extraction for the macro using the circuit extraction for the cell without performing any transistor-level analysis for the macro.

2. The method as recited in claim 1, wherein said specifying comprises using cells from said existing cell library in addition to the macro.

3. The method as recited in claim 2, wherein multiple different cells from said existing cell library each utilize a standard transistor layout pitch, and wherein the cell for said macro does not utilize said standard transistor layout pitch.

4. The method as recited in claim 1, wherein the macro-level function comprises one or more of: a memory array, a register file, a decoder for a memory array, a multiplier, a datapath, and a tag memory for a first-level cache.

5. The method as recited in claim 4, wherein the integrated circuit is a microprocessor.

6. The method as recited in claim 1, wherein said cell comprises one or more analog circuits.

7. The method as recited in claim 1, wherein the design specification is a timing requirement.

8. The method as recited in claim 1, wherein the design specification is an area requirement.

9. The method as recited in claim 1, further comprising defining an RTL model for the cell.

10. The method as recited in claim 9, further comprising, performing formal function verification of the macro using the RTL model for the cell.

11. The method as recited in claim 9, further comprising, performing formal function verification of the integrated circuit using the RTL model for the cell.

12. The method as recited in claim 9, further comprising, defining an RTL model for the macro using the RTL model for the cell.

13. The method as recited in claim 1, further comprising performing transistor-level pattern-based functional verification of the cell.

14. The method as recited in claim 1, wherein the macro for the macro-level function adheres to one or more cell-based methodologies for design-for-test or automated test pattern generation.

15. A method for designing an integrated circuit, comprising:
  identifying a macro-level function of the integrated circuit requiring custom transistor-level design to meet a design specification for the integrated circuit, wherein said identifying comprises determining that the design specification cannot be met for the macro-level function using cells from an existing cell library to be used for designing the integrated circuit;
  performing a custom transistor-level design of a cell implementing a unit of functionality for the macro-level function to meet the design specification for the integrated circuit;
  defining a macro for the macro-level function, wherein said macro comprises multiple ones of said cell;
  specifying a design for the integrated circuit using the macro to meet the design specification for the integrated circuit;
  defining static timing analysis for the cell; and
  analyzing the static timing for the macro using the static timing analysis for the cell without performing any transistor-level analysis for the macro.

16. The method as recited in claim 15, further comprising, analyzing the static timing for the integrated circuit using the static timing analysis for the cell.

17. The method as recited in claim 15, further comprising, defining a static timing model for the macro using the static timing analysis for the cell.

18. A computer-readable storage medium comprising a computer-useable data structure defining a design for an integrated circuit, and wherein the computer-useable data structure comprises:
  one or more cells from a standard cell library; and
  a macro comprising one or more custom designed cells;
  wherein a design requirement for the integrated circuit cannot be met for the macro using cells from the standard cell library;
  wherein static timing analysis for the macro can be performed using static timing analysis defined for the one or more custom designed cells without performing any transistor-level analysis for the macro; and
  wherein the data structure is encoded in a computer-usable format for use in manufacturing the integrated circuit according to the design for the integrated circuit.

* * * * *